US007032877B2

(12) United States Patent
von Willich

(10) Patent No.: US 7,032,877 B2
(45) Date of Patent: Apr. 25, 2006

(54) ACTUATOR FOR REVERSIBLY DISPLACING A VALVE FLAP OF A VALVE

(75) Inventor: Joachim von Willich, Nieder-Selters (DE)

(73) Assignee: Siemens AG, Munich (DE)

( * ) Notice: Subject to any disclaimer, the term of this patent is extended or adjusted under 35 U.S.C. 154(b) by 14 days.

(21) Appl. No.: 10/514,125

(22) PCT Filed: May 26, 2004

(86) PCT No.: PCT/EP2004/050925

§ 371 (c)(1),
(2), (4) Date: Nov. 12, 2004

(87) PCT Pub. No.: WO2004/111425

PCT Pub. Date: Dec. 23, 2004

(65) Prior Publication Data

US 2005/0236597 A1 Oct. 27, 2005

(30) Foreign Application Priority Data

Jun. 18, 2003 (DE) ................................ 103 27 868

(51) Int. Cl.
*F16K 31/44* (2006.01)

(52) U.S. Cl. ..................... 251/78; 251/77; 251/129.11; 74/439

(58) Field of Classification Search .................. 251/77, 251/78, 129.11; 74/405, 411, 412 R, 413, 74/414, 421 A, 434, 439, 444, 445, 446, 74/450
See application file for complete search history.

(56) References Cited

U.S. PATENT DOCUMENTS

| | | | | |
|---|---|---|---|---|
| 5,409,194 | A * | 4/1995 | Blanc et al. | 251/9 |
| 6,135,415 | A | 10/2000 | Kloda et al. | |
| 6,216,677 | B1 * | 4/2001 | McConnell et al. | 123/568.24 |
| 6,244,564 | B1 * | 6/2001 | Noritake | 251/129.11 |
| 6,279,535 | B1 | 8/2001 | Matsusaka | |
| 2001/0032616 | A1 | 10/2001 | Sakurai et al. | |

FOREIGN PATENT DOCUMENTS

| | | | |
|---|---|---|---|
| DE | 195 24 941 | A1 | 1/1997 |

(Continued)

OTHER PUBLICATIONS

Derwent-Abstract—DE 101 35 330A1; Feb. 6, 2003; Behr GmbH & Co., D-70469 Suttgart (Germany).
Derwent-Abstract—DE 101 33 630A1; Jan. 30, 2003; Siemens AG, D-80333 München (Germany).

(Continued)

*Primary Examiner*—Edward K. Look
*Assistant Examiner*—John K. Fristoe, Jr.
(74) *Attorney, Agent, or Firm*—J. Eisenberg; Siemens AG

(57) ABSTRACT

An actuator has a drive shaft connected to a valve flap. A toothed quadrant is mounted to be rotatable about the first axis of rotation of the drive shaft. A further quadrant is arranged in parallel with the toothed quadrant and is fixedly connected to the drive shaft. A two-armed lever is mounted between the toothed quadrant and the further quadrant to be rotatable about a second axis of rotation of a pin which is arranged in parallel with the first axis of rotation on the side, which faces the toothed quadrant, of the further quadrant. The toothed quadrant has a cutout and a projection is arranged on the two-armed lever at the end of the second lever arm of said two-armed lever and is directed into the cutout. The further quadrant has a third stop for the second toothed quadrant.

4 Claims, 3 Drawing Sheets

FOREIGN PATENT DOCUMENTS

| | | | |
|---|---|---|---|
| DE | 199 28 632 | A1 | 12/2000 |
| DE | 101 33 630 | A1 | 1/2003 |
| DE | 10135330 | A1 | 2/2003 |
| EP | 1 099 839 | A2 | 5/2001 |
| EP | 1 099 840 | A2 | 5/2001 |

OTHER PUBLICATIONS

Derwent-Abstract—DE 199 28 632A1; Dec. 28, 2000; Mannesmann VDO AG, D-60388 Frankfurt (Germany).

Derwent-Abstract—DE 195 24 941A1; Jan. 9, 1997; VDO Adolf Schinding AG, D-60326 Frankfurt (Germany).

* cited by examiner

ACTUATOR FOR REVERSIBLY DISPLACING A VALVE FLAP OF A VALVE

CROSS REFERENCE TO RELATED APPLICATIONS

The present application is a national stage application of international application PCT/EP2004/050925, filed on May 26, 2004, which designated the United States and was pending at the time of designation and the filing of the present application; and further claims priority to German patent application 10327868.0, filed Jun. 18, 2003; the both of which are herein incorporated by reference.

BACKGROUND OF THE INVENTION

The invention relates to an actuator for the reversible movement of a valve flap of a valve, and to a use of the actuator. Actuators for the reversible movement of valve flaps are known. In this case, the valve flap is respectively fixed to a drive shaft which is connected to an electric motor at a constant transmission ratio. With these known actuators, it is disadvantageous that the valve flaps can be moved only with relative difficulty after relatively long operating times as a result of soiling in the valve. The accumulated dirt causes the valve flaps to stick or cake in the valve and the valve flaps can only be released from the stuck position by means of a relatively large torque, which is often not possible or is only possible with a delay at the constant transmission ratio.

SUMMARY OF THE INVENTION

The invention is therefore based on the object of providing an actuator for the reversible movement of a valve flap of a valve which allows the valve flap to be released relatively easily, even with severe accumulation of dirt in the interior of the valve. The invention is also based on the object of providing a use of the valve.

The object on which the invention is based is achieved by means of an actuator for the reversible movement of a valve flap of a valve which comprises a drive shaft to which the valve flap is fixed, in which actuator a toothed quadrant is mounted so as to be rotatable about the first axis of rotation D1 of the drive shaft, the toothed quadrant not being fixedly connected to the drive shaft, and a further quadrant, which is larger than the toothed quadrant, is arranged in parallel with the toothed quadrant and is fixedly connected to the drive shaft, in which actuator a two-armed lever is mounted between the toothed quadrant and the further quadrant so as to be rotatable about a second axis of rotation D2 of a pin which is arranged in parallel with the first axis of rotation D1 on the side, which faces the toothed quadrant, of the further quadrant, and said lever does not touch the drive shaft, the first axis of rotation D1 being further away from the toothed ring of the toothed quadrant than the second axis of rotation D2 and the first lever arm a, which faces the first axis of rotation D1 when the valve is in the closed position, of the two-armed lever being larger than the distance c between the second axis of rotation D2 and that edge of the further quadrant which, together with one edge of the toothed quadrant, rests flush against a first stop when the valve is in the closed position, in which actuator the toothed quadrant has a cutout and a projection is arranged on the two-armed lever at the end, which faces away from the second axis of rotation D2, of the second lever arm b of said two-armed lever and is directed into the cutout, and in which actuator the further quadrant has a third stop for the second toothed quadrant on the edge of said quadrant which faces a second stop which can be associated with the open position of the valve. The valve flap is generally fixed to the end of the drive shaft. The actuator is driven by means of an electric motor which makes the toothed quadrant rotate. Similarly to the toothed quadrant, the further quadrant is in the form of a partial circle, the pitch circle of this further quadrant being larger than the pitch circle of the toothed quadrant. The further quadrant may, for example, also be in the form of a toothed quadrant. The two-armed lever is advantageously made of flat material. It is rotatably mounted on the pin which is arranged in parallel with the first axis of rotation D1 on the side, which faces the toothed quadrant, of the second quadrant, and is thus not fixedly connected to the pin. The two-armed lever does not touch the drive shaft. This is true for all positions during operation of the actuator. The open position of the valve is defined as the position in which both the toothed quadrant and the further quadrant rest against the second stop, it being possible for direct contact to be made in this case by means of the third stop which is fixedly arranged on the further quadrant. The third stop is arranged, for example, on that side of the further quadrant which faces the toothed quadrant. It has surprisingly been found that the torque in the starting state can be effectively increased by this structural design of the actuator, which then also ensures that the valve flap is released in the valve even if large amounts of dirt have accumulated in the interior of the valve. This is achieved by a relatively low rotational speed of the drive shaft in the starting state when the valve opens. As soon as the toothed quadrant reaches the third stop, which is arranged on the further quadrant, the toothed quadrant and the further quadrant move at the same angular velocity. Before this point, the actuator is in what is known as the starting state, where the toothed quadrant moves at a greater angular velocity than the further quadrant. However, since the further quadrant, and not the toothed quadrant, is fixedly connected to the drive shaft, said drive shaft also rotates more slowly in the starting state and this leads directly to an increase in torque when the same amount of power is supplied, and this increase in torque allows the valve flap inside the valve in which dirt has accumulated to be released in a relatively simple manner.

One preferred refinement of the invention comprises forming the side, which faces the first axis of rotation D1, of the two-armed lever by two component arms which are arranged at right angles to one another. The advantageous factor in this case is that, for example, an eccentric arrangement of the pin with respect to the two-armed lever can be dispensed with.

According to a further preferred refinement of the invention, the toothed ring of the toothed quadrant engages directly into the pinion of an electric motor. The advantageous factor here is that the arrangement of further gear elements, such as intermediate gears, can be dispensed with.

A further preferred refinement of the invention provides for the further quadrant to be connected to a spring element whose spring force is directed toward the further quadrant in the direction of the first stop. The spring element may be, for example, a torsion spring. The further quadrant may in this case be directly or indirectly connected to the spring element by means of a connecting part. The advantageous factor in this case is that even if the electric motor fails, the actuator can be operated solely by the force of the spring element such that the valve flap is again moved into the closed position of the valve.

The invention finally relates to the use of the actuator for the reversible movement of a valve flap of a gas recirculation valve in a motor vehicle. Dirt, to which the valve flap sticks, often disadvantageously accumulates in gas recirculation valves in motor vehicles. By means of the actuator, the valve flap of a gas recirculation valve can be moved easily, even with relatively severe accumulation of dirt.

BRIEF SUMMARY OF THE SEVERAL VIEWS OF THE DRAWINGS

The invention is explained in greater detail and by way of example in the text which follows with reference to the drawing (FIG. 1 to FIG. 6).

DETAILED DESCRIPTION OF THE INVENTION

Figure 1:
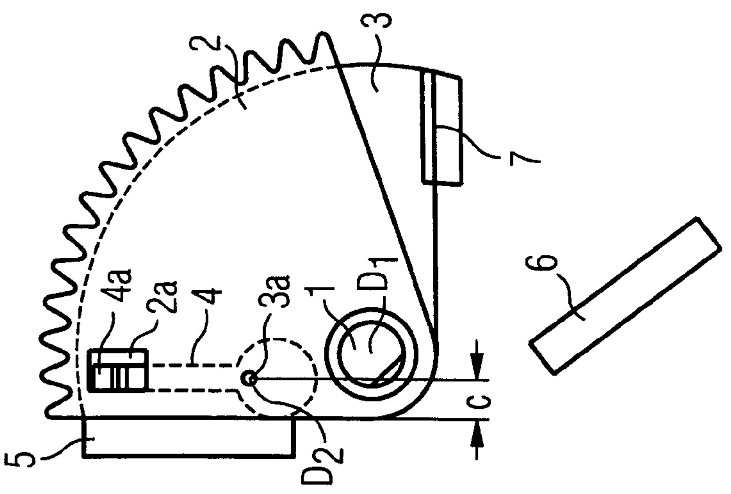
FIG. 1 shows a plan view of the actuator when the valve is in the closed position.

In FIG. 1, the actuator is illustrated in the form of a plan view when the valve is in the closed position. The actuator comprises a drive shaft 1 to which the valve flap (not illustrated) is fixed. In the actuator, a toothed quadrant 2 is mounted so as to be rotatable about the first axis of rotation D1 of the drive shaft 1, the toothed quadrant 2 not being fixedly connected to the drive shaft 1. A further quadrant 3, which is larger than the toothed quadrant 2, is arranged in parallel with the toothed quadrant 2. In contrast to the toothed quadrant 2, this further quadrant 3 is fixedly connected to the drive shaft 1. A two-armed lever 4 is mounted between the toothed quadrant 2 and the further quadrant 3 so as to be rotatable about a second axis of rotation D2 of a pin 3*a* which is arranged in parallel with the first axis of rotation D1 on the side, which faces the toothed quadrant 2, of the further quadrant 3. This two-armed lever 4 does not touch the drive shaft 1. The first axis of rotation D1 is further away from the toothed ring of the toothed quadrant 2 than the second axis of rotation D2. The toothed quadrant 2 has a cutout 2*a*. A projection 4*a* is arranged on the two-armed lever 4 at one end of said two-armed lever 4 and is directed into a cutout 2*a* in the toothed quadrant 2. The further quadrant 3 has a third stop 7 for the second toothed quadrant on its edge which faces a second stop 6 which can be associated with the open position of the valve. There is a distance c between the second axis of rotation D2 and that edge of the further quadrant 3 which, together with one edge of the toothed quadrant 2, rests flush against a first stop 5 when the valve is in the closed position. If, when the valve is in the closed position, the actuator is then set in motion, the toothed quadrant 2 is rotated clockwise by means of an electric motor (not illustrated). The aim here is to reach the second stop 6 which can be associated with the opened position of the valve. As soon as the toothed quadrant 2 is made to rotate, the two-armed lever 4 is rotated about the axis of rotation D2, which leads to the further quadrant 3 also being made to rotate clockwise. However, in this case, the further quadrant 3 rotates more slowly than the toothed quadrant 2.

Figure 2:
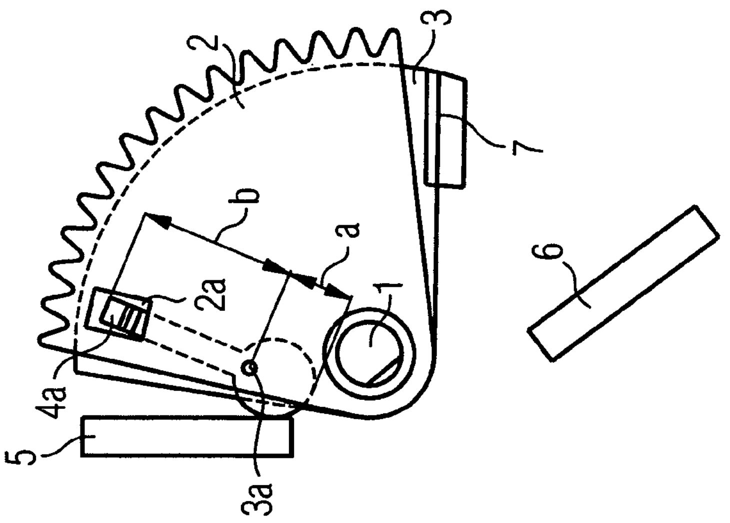
FIG. 2 shows a plan view of the actuator in a position between the closed and the opened position of the valve.

FIG. 2 is a plan view of the actuator in a position between the closed state and the opened state of the valve. The first lever arm a, which faces the first axis of rotation D1, of the two-armed lever 4 is larger than the distance c, as illustrated in FIG. 1, between the second axis of rotation D2 and that edge of the further quadrant 3 which, together with one edge of the toothed quadrant 2, rests flush against a first stop 5 when the valve is in the closed position. A projection 4*a* is arranged on the two-armed lever 4 at the end, which faces away from the second axis of rotation D2, of the second lever arm b of said two-armed lever 4 and is directed into the cutout 2*a*. As the toothed quadrant 2 moves clockwise, the first lever arm a of the two-armed lever presses against the first stop 5. As a result, the further quadrant 3 is likewise moved clockwise in the direction of the second stop 6. If the rotation of the toothed quadrant 2 is continued, the toothed quadrant 2 will reach the third stop 7. If clockwise rotation of the toothed quadrant 2 is continued still further, both the toothed quadrant 2 and the further quadrant 3 are then moved at the same speed in each case in the direction of the second stop 6. As soon as the toothed quadrant 2 makes contact with the third stop 7, the starting state of the actuator is concluded and the valve flap (not illustrated) is released from the accumulated dirt.

Figure 3:
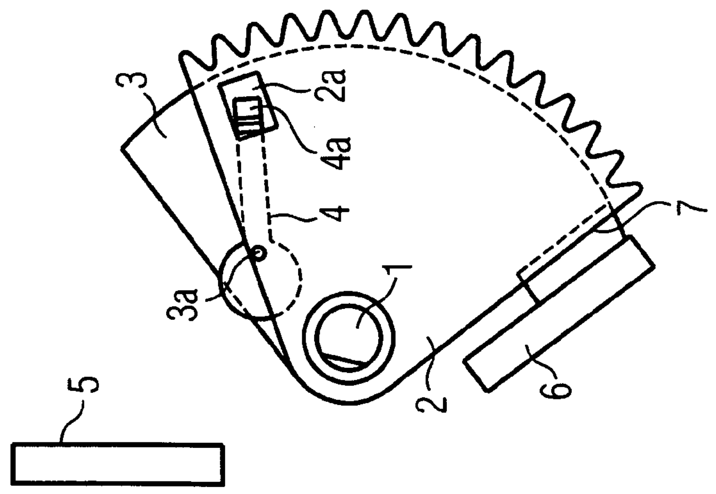
FIG. 3 shows a plan view of the actuator when the valve is in the opened position.

FIG. 3 is a plan view of the actuator when the valve is in the opened position. Both the toothed quadrant 2 and the further quadrant have now reached the second stop 6 which can be associated with the open position of the valve. Depending on the design of the third stop 7, the toothed quadrant 2 and the further quadrant 3 may rest directly or indirectly against the second stop 6. If the valve is to be closed again, this movement can be reversed until the state illustrated in FIG. 1 is reached again.

Figure 4:
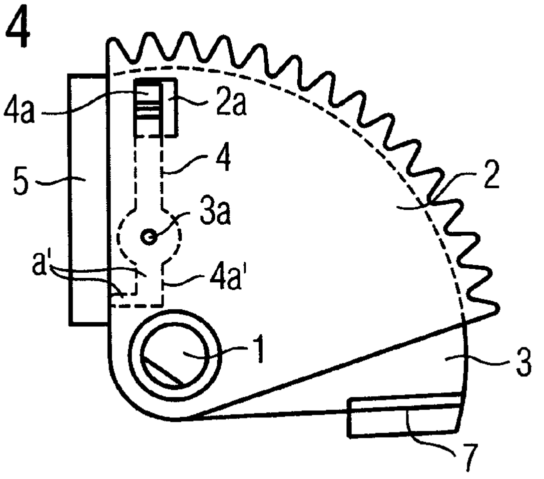
FIG. 4 shows a plan view of the actuator when the valve is in the closed position with an alternative refinement of the two-armed lever without the second stop.

FIG. 4 is a plan view of the actuator when the valve is in the closed state. In contrast to the embodiment illustrated in FIG. 1, the side 4*a*', which faces the first axis of rotation D1, of the two-armed lever 4 is formed by two component arms a' which are arranged at right angles to one another. The second stop has not been illustrated for reasons of clarity.

Figure 5:
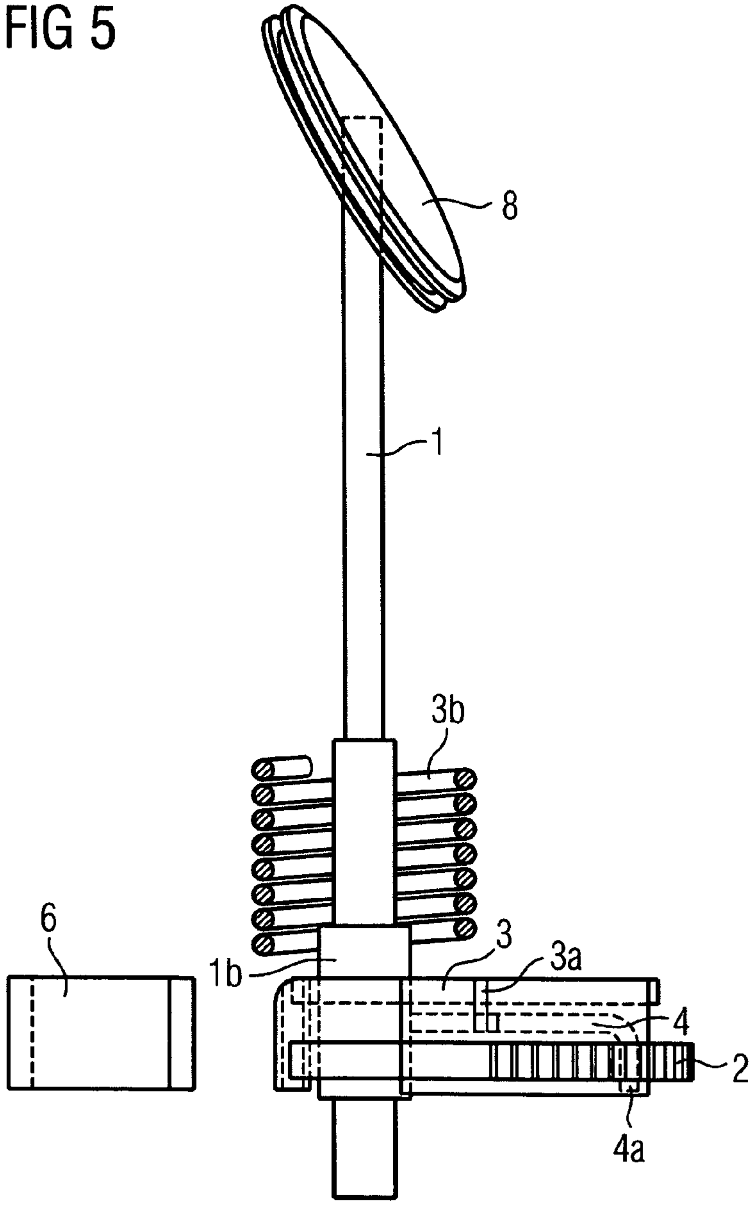
FIG. 5 shows a side view of the actuator when the valve is in the closed position.

FIG. 5 is a side view of the actuator when the valve is in the closed position. The further quadrant 3 is in this case connected to a spring element 3*b* whose spring force is directed toward the further quadrant 3 in the direction of the first stop (not illustrated). In this case, the further quadrant 3 and the spring element 3*b* are connected indirectly by means of a connecting part 1*b* which is fixedly connected to the drive shaft 1. The illustrated actuator is suitable with particular advantage for the reversible movement of a valve flap of a gas recirculation valve in a motor vehicle.

Figure 6:
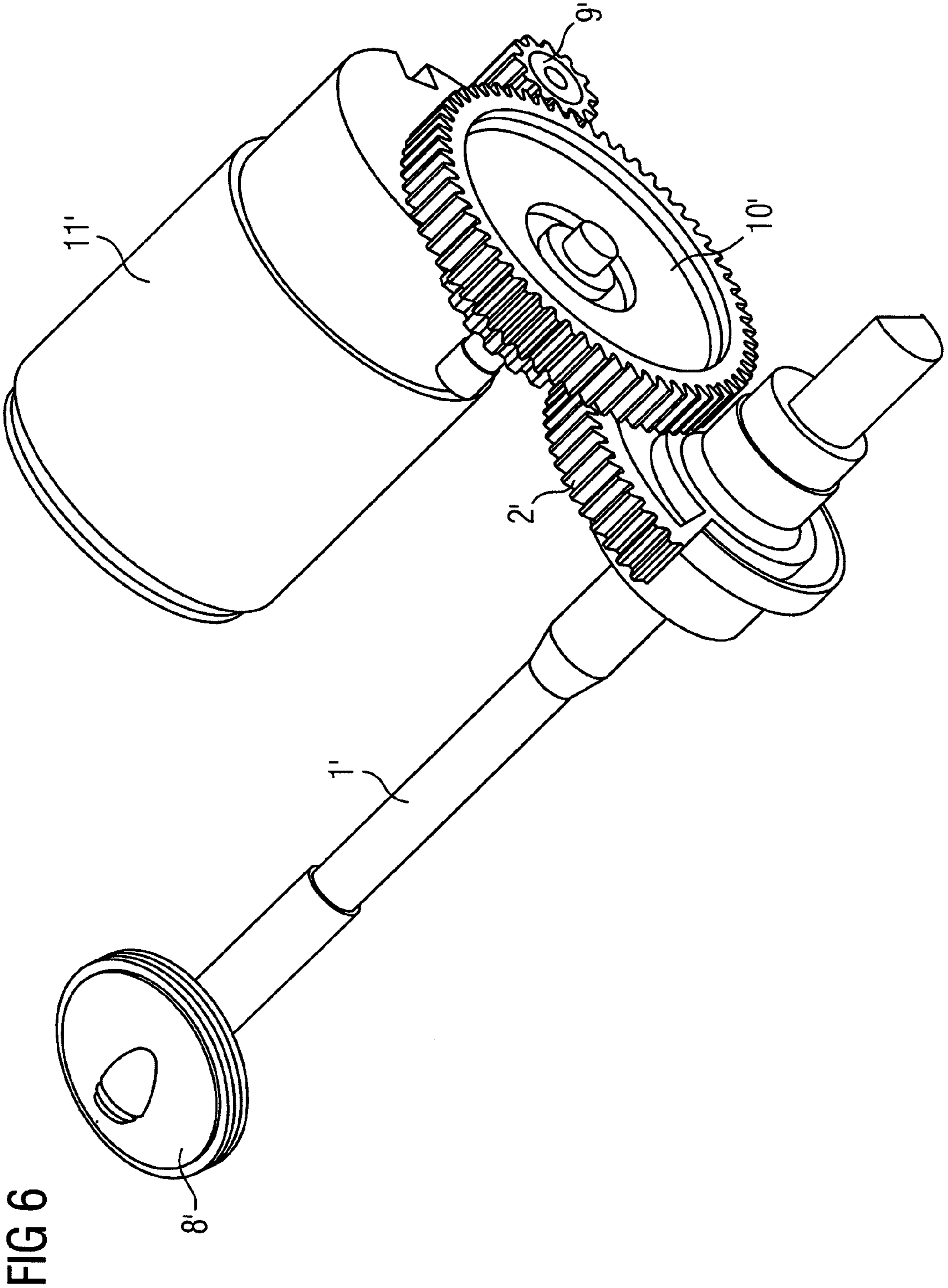
FIG. 6 shows an actuator according to the prior art.

FIG. 6 illustrates an actuator according to the prior art. In this case, a valve flap 8' is fixedly connected to a drive shaft 1'. A toothed quadrant 2', which is connected to the pinion 9' of an electric motor 11' by means of an intermediate gear 10', is arranged on the drive shaft 1'. The transmission ratio here is constant, with the result that it is impossible for the torque which acts on the valve flap 8' to be increased in the starting state when there is a constant supply of power to the electric motor 11'. With such an actuator, it is difficult to release the valve flap 8' in the valve if encrustations are present and dirt has accumulated in the valve.

The invention claimed is:

1. An actuator for reversibly moving a valve flap of a valve, comprising:

a drive shaft to which the valve flap is connected;

a toothed quadrant mounted to be rotatable about a first axis of rotation of the drive shaft, wherein the toothed quadrant is not fixedly connected to the drive shaft;

a further quadrant larger than the toothed quadrant and arranged in parallel with the toothed quadrant and fixedly connected to the drive shaft;

a two-armed lever mounted between the toothed quadrant and the further quadrant to be rotatable about a second axis of rotation of a pin which is arranged in parallel with the first axis of rotation on a side of the further quadrant that faces the toothed quadrant, wherein the lever does not touch the drive shaft, wherein the first axis of rotation is further away from a toothed ring of the toothed quadrant than the second axis of rotation and wherein a first lever arm, which faces the first axis of rotation when the valve is in a closed position, of the two-armed lever is larger than a distance between the second axis of rotation and an edge of the further quadrant which, together with one edge of the toothed quadrant, rests flush against a first stop when the valve is in the closed position;

wherein the toothed quadrant has a cutout and a projection is arranged on the two-armed lever at an end, which faces away from the second axis of rotation, of a second lever arm of the two-armed lever and is directed into the cutout, and wherein the further quadrant has a third stop for the second toothed quadrant on an edge which faces a second stop that is associable with an open position of the valve.

2. The actuator of claim 1, wherein the side, which faces the first axis of rotation, of the two-armed lever is formed by two component arms that are arranged at right angles to one another.

3. The actuator of claim 1, wherein the toothed ring of the toothed quadrant engages directly into a pinion of an electric motor.

4. The actuator of claim 1, wherein the further quadrant is connected to a spring element having a spring force directed toward the further quadrant in a direction of the first stop.

* * * * *